United States Patent Office 3,556,830
Patented Jan. 19, 1971

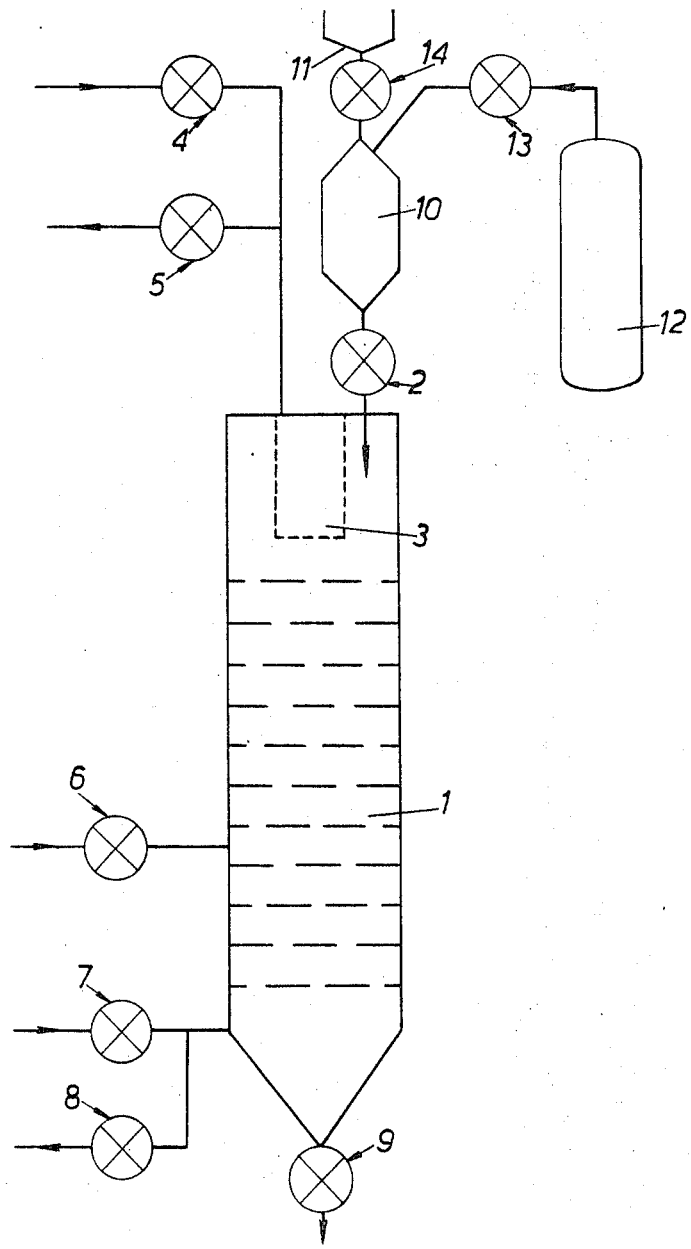

3,556,830
TREATMENT OF FILLERS
Jean-Jacques Charrin, Lyon, and Pierre Joseph Frechet, Caluire, France, assignors to Rhone-Poulenc S.A., Paris, France, a French body corporate
Filed Feb. 23, 1968, Ser. No. 707,854
Claims priority, application France, Feb. 28, 1967, 96,873
Int. Cl. C09c 3/00; C03c 25/00
U.S. Cl. 106—309                              6 Claims

ABSTRACT OF THE DISCLOSURE

Finely divided fillers are treated with organopolysiloxanes by introduction into the top of a column provided with baffles, organopolysiloxane vapour being introduced to the bottom of the column alternately with inert gas introduced at the top of the column.

---

This invention relates to the continuous treatment of mineral fillers with vapours of linear or cyclic organopolysiloxanes, or mixtures thereof.

It is already known to treat finely divided mineral fillers, such as silicas, silicates or metallic oxides, with organosilicon compounds which impart thereto various advantageous properties, more particularly a water-repelling character. Generally, the mineral fillers are continuously introduced into the treatment apparatus so as to form a substantially stationary layer which is fluidised by a rising current of flushing vapours or gases. The rate of supply, i.e. the speed, of the said vapours or gases is so adjusted that the mineral fillers are maintained in intensely agitated suspension and are slowly moved towards the discharge orifice from which they are isolated and collected. It has been possible by this method to improve the coefficients of transfer of mass and heat hitherto obtained, and hence to reduce the duration of the treatment and the volume of the installation.

However, since mineral fillers often consist of extremely fine particles of very low apparent density, the control of the level of the fluidised bed and the isolation of the treated mineral fillers are particularly difficult. Thus, to separate the fluidising vapours or gases from the mineral fillers, it is necessary to have available costly means of separation, such as a series of cyclones, which are not efficient under these particular conditions, or bulky filters which have to be decongested with gases which momentarily prevent the fluidisation. Moreover, despite the advances achieved, the duration of the treatment is still considerable and the production per unit volume of installation is still low, which results in a relativey high cost of the treated fillers and limits the economic advantage of this type of product.

This invention provides a new method of continuously treating finely divided mineral fillers with organopolysiloxane vapours, in a manner such that the production per unit volume of installation employed is substantially increased. The new process comprises introducing the said filler at the top of a substantially vertical column provided with baffles, and alternately and repeatedly introducing a rising current of organopolysiloxane vapour at the foot of the column and a descending current of inert gas at the top of the column, at rates such that the speeds of the said vapour and gas through the orifices in the baffles are from 1 to 6 times the speed of sedimentation of the filler in the said vapour or gas as the case may be. Generally speaking the column is operated at a temperature of 100° to 600° C. at an absolute pressure above 20 mm. Hg.

In the process of the invention, the mineral filler is continuously or discontinuously introduced into the upper part of a vertical treatment chamber provided with baffles. At the same time, the organopolysiloxane vapour, is introduced into the lower part as a rising current, which brings a large proportion of the filler into suspension, near the upper part, where the entrained fillers are separated from the residual vapours, which are preferably recycled. An inert gas is then introduced through the separating device as a descending current which maintains a large proportion of the filler in suspension, near the base of the apparatus, where the treated filler is withdrawn. This procedure is continued in regularly repeated cycles, the durations of admission of the vapour and of the inert gas being so adjusted that the filler is withdrawn after an appropriate degree of treatment in a minimum time.

For a readier understanding, the new process will be described in detail with reference to the accompanying drawing, which illustrates diagrammatically an apparatus for carrying out the process.

In a first phase, the mineral filler is introduced from a lock chamber 10 into the vertical treatment column 1 provided with regularly spaced baffles by opening the valve 2, which is then rapidly closed. At the same time, preheated organopolysiloxane vapours are introduced by opening the valve 7, so that the apparatus is upwardly flushed by these vapours, the vapours and the gas initially present in the column being allowed to escape by opening the valve 5. In a second phase, the valves 5 and 7 are closed, and the valves 4 and 9 are simultaneously opened, so that the apparatus is downwardly flushed by an inert gas and the treated filler is discharged.

In the first phase, the mineral fillers coming from the lock chamber are fed as follows. The lock chamber 10 is previously filled with the mineral filler from the reservoir 11 and then rapidly emptied. A gas inert to the filler, for example nitrogen, maintained under pressure in the reservoir 12 flows into the lock chamber as soon as the valve 13 is opened and drives out the filler through the open valve 2 into the uper zone of the column 1. The valves 2 and 13 are then closed and the valve 14 opened for the next cycle.

The organopolysiloxane vapours are introduced into the lower part of the column 1 after opening of the valve 7 under a pressure which overcomes the pressure losses encountered in the passage of the vapours through the apparatus. These vapours rise in the column 1, which is compartmented by a series of baffles consisting of perforated plates. They rapidly pass through the holes in each plate, whirl between two plates, and rapidly escape upwards through the holes in the next plate. These vapours thus undergo a very large number of changes of direction and speed in passing through each plate. Owing to the small degree of perforation of the plates, i.e. the small cross-sectional area of flow offered to the vapours, the latter locally reach high speeds without their rate of flow being considerable. The rising current of vapour (and the descending current of inert gas in the second phase) pass through the orifices in each plate at speeds higher than the speed of sedimentation of the solid particles in the corresponding media under the existing conditions of temperature and pressure. Plates having an extent of perforation between 4% and 20% may be employed, and the speeds of the vapour (or inert gas) at the orifices may be from 1 to 6 times the speed of sedimentation. In each turbulence zone situated between two consecutive plates, the fillers are thus maintained in suspension and their entrainment from one turbulence zone to the other remains limited. Within each turbulence zone, the fillers may momentarily remain deposited in a small quantity and in a small depth on the imperforate surfaces of the lower plate. The speeds of the rising current of vapour in the first phase and descending current of gas in the second phase are advantageously substantially equal.

Owing to the small extent of perforation of the plates, only a small fraction of the fillers is entrained to an upper level by the rising current of vapour. During this first phase, a turbulent suspension of the fillers is obtained, which affords effective contact between the filler and the vapour. The residual vapours reach the upper zone of the column 1 in which they pass through the filter 3, on which they deposit the fine particles which they have entrained, and they can escape through the valve 5 and are preferably recycled.

The filter 3 could become gradually clogged by the filler, but as soon as it is reached by the vapours introduced through the valve 7, the second phase may be initiated by closing the valves 5 and 7 and simultaneously opening the valves 4 and 9.

Gas inert to the filler, for example nitrogen, isintroduced into the upper zone of the column 1 by opening the valve 4 under a pressure which enables it to overcome the loss of pressure encountered in passage through the column. The gas penetrates the filter 3, which is thereby unclogged, and then descends rapidly through the apertured plates to the base of the apparatus. In this way it entrains the mineral filler already in suspension or deposited on the plates in eddies similar to those produced by the rising vapour, so that it can entrain the excess of organopolysiloxane fixed on the filler. Moreover, it transfers a proportion of the filler from one turbulence zone into a lower zone, with the assistance of gravity. However, the small extent of the perforation of the plates makes it possible to limit the vertical displacement of the filler, and thus to increase its residence time in the column and to effect complete interaction with the vapour. Finally, the inert gas facilitates the discharge of the filler through the valve 9 at the bottom of the column 1. The duration of the second phase is adjusted independently of the duration of the first phase to enable the gas introduced through the valve 4 to reach the base of the column and to adjust the residence time of the filler in the column to a sufficient value for complete interaction with the vapour.

A further identical two-phase cycle is then begun, the duration of which is between 5 seconds and 20 minutes, and preferably between 20 seconds and 8 minutes. The frequent reversals of the direction of flow of the vapour and gas increase the turbulence in each zone of contact and maintain high relative speeds between the vapour or gas and the filler, so that excellent contact between them results.

The vapour and inert gas, the pressures of which are exerted alternately on each face of the plates, immediately clear and clogged holes in the plates if that is necessary. Also, the filter 3 is declogged, by using a higher rate of gas flow and a higher frequency of flow reversal than is otherwise necessary, so that completely satisfactory operation at all times is assured.

The introduction of the filler may take place discontinuously, for example with the aid of the lock chamber 10 or of a separate reservoir, with a rotary distributor, or with any equivalent device. It may also be continuously introduced, for example with a screw feed.

The valves 14, 2 and 9 preferably afford a direct passage and have orifices of large cross-section to facilitate the flow of the filler. The opening and closing of each valve is remote-controlled by any known means at precise instants, in identical cycles determined as a function of a preset programme.

If desired, the inert gas may be discharged from the lower part of the apparatus through the valve 8 and then filtered and recycled.

It is possible without departing from the scope of the present invention to subdivide one of the phases of each cycle into a number of phases. For example, the vapour and a part of inert gas may be simultaneously or successively introduced either through a common pipe or through a number of pipes situated at a common level or at different levels of the lower zone and even of the central zone of the column (see Example 2).

The new process may be applied to a wide variety of fillers, such as precipitated silicas, silicas of combustion, diatomaceous silicas, ground quartz, mica, talc and other silicates, metallic oxides such as titanium oxide, iron oxide, zirconium oxide, and alumina, whose elemental particles or agglomerates have dimensions of less than 1 mm. and preferably less than 100 microns ($\mu$). All vaporisable organpolysiloxanes can be used but it is preferable to employ those whose boiling point under normal pressure is below 450° C. For example, linear diorganopolysiloxanes whose chain ends are blocked by triorganosilyl groups, such as decamethyltetrasiloxane or hexamethyldisiloxane, or cyclic disorganopolysiloxanes such as octamethylcyclotetrasiloxane, hexamethylcyclotrisiloxane, 1,3,5,7 - tetravinyl - 1,3,5,7 - tetramethylcyclotetrasiloxane and 1,3,5,7 - tetrahydrogeno - 1,3,5,7 - tetramethylcyclotetrasiloxane may be used.

The fillers produced b ythe new process may be employed in elastomer compostions, in organosilicon greases and pastes, in anti-foam and mould-release agents, or as thickeners in general.

The new process makes it possible to impregnate fillers in very short times using small quantities of vapours and gases, and only requires the use of apparatus of small volume. The latter is very simple and more particularly it comprises no moving parts. Finally, the operations of the valves in the apparatus may be controlled by a programme which guarantees complete regularity and reliability of the operations and of the quality of the products obtained.

The following examples illustrate the invention.

EXAMPLE 1

A stainless-steel apparatus as illustrated in the drawing is employed, consisting of a column arranged with its axis vertical, the central zone of which has a diameter of 100 mm. and a height of 1250 mm. and contains 25 baffles consisting of horizontal discs. These discs are fitted within the column and are each formed with holes 12 mm. in diameter distributed at the corners of a square having sides of 43 mm., which is concentric with the disc, the holes in successive discs being equally staggered. These discs have an extent of perforation of 5.7% and are maintained 50 mm. apart by cross members. The column is surrounded by electrical resistor heaters for maintaining a temperature of 500° C. in the interior of the column. At the top, the diameter of the column is brought to 124 mm. and there is disposed therein a filter of sintered stainless steel having a porosity of $10\mu$ and a surface of 5.7 dm.$^2$, as also a device for the introduction of solid materials, composed of a spherical glass lock chamber having a useful volume of 525 cc., bounded by two rubber sleeve valves each having an orifice of 40 mm., and connected to a source of nitrogen under a relative pressure of 0.2 bar. The base of the column is conical, the angle of the cone being 60°, and a cock having a spherical plug with an orifice of 20 mm. is secured to its apex. The various valves are automatic and are pneumatically controlled with the aid of a clockwork movement provided with a cam device.

Octamethylcyclotetrasiloxane vapours are brought into contact with silica powder having an apparent density of between 30 and 60 g. per litre, and a grain size of between 5 and 20 milli-$\mu$, and of which the elemental particles from agglomerates of the order of $10\mu$. The speeds of sedimentation of this powder are 1 metre per sec. in nitrogen at 500° C. and 0.5 metre per sec. in octamethylcyclotetrasiloxane vapours. At a temperature of 450° to 500° C., the silica is impregnated by a part of the vapours. It is desired to treat the silica in a minimum time in order to obtain a good productivity of the apparatus, while fixing 7% by weight of siloxanes on the silica particles.

The operation is carried out in repeated cycles each comprising two phases. In the first phase, which lasts 40 seconds, 6 kg. per hour of octamethylcyclotetrasiloxane vapours at a temperature of 500° C. and under a relative pressure of the order of 0.13 bar are introduced into the base of the column. Contacts are established between the vapours and the silica powder at each baffle. The vapours rise through the column, pass through the holes in each disc at a speed of 2 m. per second and whirl between each disc (in the absence of discs, the mean speed of the vapours would be 11.8 cm. per second), and then pass through the filter and are finally condensed before being recycled. At the beginning of the first phase, the 525 cc. of silica powder contained in the lock chamber are introduced into the column in 3 seconds under nitrogen pressure. The lock chamber is then isolated from the column and filled during the remainder of the cycle. The second phase, which lasts 6 seconds, is initiated by passing a current of 0.263 kg. per hour of nitrogen at a temperature of 500° C. and under a relative pressure of the order of 0.13 bar through the filter to clear it. This descending current maintains and accentuates the turbulences in the central zone, entrains a part of the silica powder at the lower levels, and facilitates its discharge and escape from the base of the apparatus. Identical cycles are commenced every 46 seconds, and in this way it is possible to impregnate about 46 litres per hour, i.e. 1.5 kg./h., of silica, the mean residence time of which is 3 minutes.

If this process is compared with the treatment of silica in a fluidised medium in which the impregnation of the silica by the vapours is completed only after a residence time of 30 minutes, it will be seen that the new process can be carried out with an apparatus of smaller volume for the same production.

EXAMPLE 2

It is found that the silica, impregnated to an extent of 7% as described in Example 1, entrains with it, despite the flushing with the current of nitrogen, a slight excess of octamethylcyclotetrasiloxane molecules, which is lost at the time of the withdrawal. It is therefore advantageous to eliminate this excess. An apparatus similar to that described in Example 1 is employed, but an additional lower section is provided in the column having 15 identical discs spaced 50 mm. apart with a lateral pipe (6 in the drawing) between the two sections. The whole column thus contains 40 identical discs distributed over a total height of 2 metres.

The mineral filler is introduced in each cycle in the same was as described in Example 1. The polysiloxane vapour and the nitrogen are pulsed in cycles now comprising three phases. The first phase lasts 22 seconds. 2.5 kg./h. of octamethylcyclotetrasiloxane vapours at a temperature of 500° C. and under a relative pressure of about 0.13 bar are introduced into the central zone of the apparatus through the lateral pipe. These vapours rise through the column, in which they become partly fixed on the silica, and the residual vapours escape through the filter and are condensed and recycled. The second phase lasts 32 seconds. 1.251 kg./hour of nitrogen at 500° C. under a relative pressure of about 0.2 bar are introduced into the base of the apparatus. This nitrogen rises through the column, effecting the desorption of the excess of vapours fixed to the silica and then escaping through the filter before being recycled. The third phase lasts 2 seconds. 0.0876 kg./hour of nitrogen at 500° C., under a relative pressure of about 0.2 bar is introduced at the top of the column, thereby entraining a part of the silica and facilitating its discharge, and escapes from the base of the column. Identical cycles are repeated and in this manner in 56 seconds 525 cc. of silica per cycle, i.e. about 34 litres per hour, or 1.2 kg. per hour, of silica can be treated. The silica is impregnated with the organopolysiloxane to an extent of 7%, as required, although the speeds of the vapours in the column are only a quarter of those in Example 1. There is no loss of poly silioxane vapour in the withdrawal and the mean residence time of the silica remains equal to 3 minutes.

We claim:
1. Process for treating a finely divided mineral filler with an organopolysiloxane vapour which comprises introducing the said filler at the top of a substantially vertical column provided with baffles, and alternately and repeadedly introducing a rising current of organopolysiloxane vapour at the foot of the column and a descending current of inert gas at the top of the column via a filter, at rates such that the speeds of the said vapour and gas through the orifices in the baffles are from 1 to 6 times the speed of sedimentation of the filler in the said vapour or gas as the case may be.

2. Process according to claim 1 in which each current is introduced for at least long enough to allow the said vapour or gas as the case may be to penetrate to the opposite end of the column.

3. Process according to claim 1 in which a rising current of inert gas in introduced at the foot of the column after the introduction of the said rising current of vapour but before the introduction of the said descending current of inert gas.

4. Process according to claim 1 in which the treatment is carried out at 100° to 600° C. under an absolute pressure above 20 mm. Hg.

5. Process according to claim 1 in which the plates have an extent of perforation between 4% and 20%.

6. Process according to claim 1 in which the filler is silica having a particle size less than 100μ.

References Cited

UNITED STATES PATENTS 3,085,905   4/1963   Prevot et al. _____ 117—100Si

TOBIAS E. LEVOW, Primary Examiner

H. M. S. SNEED, Assistant Examiner

U.S. Cl. X.R.

106—308; 117—100